United States Patent
Lim et al.

(10) Patent No.: US 9,936,529 B2
(45) Date of Patent: Apr. 3, 2018

(54) METHOD FOR PERFORMING OR SUPPORTING D2D COMMUNICATION IN WIRELESS COMMUNICATION SYSTEM AND APPARATUS THEREFOR

(71) Applicant: LG ELECTRONICS INC., Seoul (KR)

(72) Inventors: Dongguk Lim, Anyang-si (KR); Jiwoong Jang, Anyang-si (KR); Hangyu Cho, Anyang-si (KR); Jinsoo Choi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 275 days.

(21) Appl. No.: 14/361,468

(22) PCT Filed: Nov. 28, 2012

(86) PCT No.: PCT/KR2012/010163
§ 371 (c)(1),
(2) Date: Aug. 26, 2014

(87) PCT Pub. No.: WO2013/081370
PCT Pub. Date: Jun. 6, 2013

(65) Prior Publication Data
US 2015/0003440 A1 Jan. 1, 2015

Related U.S. Application Data

(60) Provisional application No. 61/564,302, filed on Nov. 29, 2011.

(51) Int. Cl.
*H04L 12/403* (2006.01)
*H04W 76/02* (2009.01)
(Continued)

(52) U.S. Cl.
CPC ......... *H04W 76/023* (2013.01); *H04W 74/06* (2013.01); *H04W 8/005* (2013.01); *H04W 8/24* (2013.01)

(58) Field of Classification Search
CPC ......... H04W 4/08; H04W 8/005; H04W 8/24; H04W 8/176; H04W 60/00;
(Continued)

(56) References Cited

U.S. PATENT DOCUMENTS 5,862,452 A * 1/1999 Cudak ................. H04W 74/004
455/321
2005/0157659 A1 7/2005 Huitema
(Continued)

FOREIGN PATENT DOCUMENTS

KR 10-2009-0102152 9/2009
KR 10-2010-0108184 10/2010

OTHER PUBLICATIONS

ETSI, "Machine-to-Machine Communications (M2M); Functional Architecture," ETSI TS 102 690 V1.1.1, Oct. 2011, 280 pages (relevant pages pp. 73-74, 113, 202-203).
(Continued)

*Primary Examiner* — Harun Chowdhury
(74) *Attorney, Agent, or Firm* — Lee Hong Degerman Kang Waimey

(57) ABSTRACT

Disclosed are a method for performing or supporting D2D communication in a wireless communication system and an apparatus therefor. The method for enabling a D2D terminal to perform D2D communication according to the present invention comprises the steps of: receiving polling interval information allocated to transmit a polling signal for the D2D communication from a base station; and transmitting the polling signal to the base station within the allocated polling interval. The polling signal comprises an identifier of the D2D terminal, an identifier of a target D2D terminal selected through a search, and an indicator for indicating the execution of D2D communication.

11 Claims, 7 Drawing Sheets

(51) Int. Cl.
*H04W 74/06* (2009.01)
*H04W 8/00* (2009.01)
*H04W 8/24* (2009.01)

(58) Field of Classification Search
CPC . H04W 74/004; H04W 74/06; H04W 76/023; H04W 8/186
USPC ........ 370/311, 336, 346, 329, 449; 455/458, 455/509, 426.1; 709/227
See application file for complete search history.

(56) References Cited

U.S. PATENT DOCUMENTS

| | | | | |
|---|---|---|---|---|
| 2011/0258327 | A1* | 10/2011 | Phan | H04W 76/023 709/227 |
| 2012/0155350 | A1* | 6/2012 | Wentink | H04W 8/005 370/311 |
| 2012/0184306 | A1* | 7/2012 | Zou | H04W 76/023 455/458 |
| 2012/0322484 | A1* | 12/2012 | Yu | H04W 4/08 455/509 |
| 2013/0122893 | A1* | 5/2013 | Turtinen | H04W 8/005 455/423 |
| 2014/0120907 | A1* | 5/2014 | Yu | H04W 76/023 455/426.1 |
| 2014/0321423 | A1* | 10/2014 | Kalhan | H04W 76/023 370/330 |

OTHER PUBLICATIONS

Chou, et al., "M2M_POLL-ADV to support M2M periodic report," IEEE 802.16 Broadband Wireless Access Working Group, IEEE C802.16p-11/0067r2, May 2011, 7 pages.

PCT International Application No. PCT/KR2012/010163, Written Opinion of the International Searching Authority dated Feb. 20, 2013, 16 pages.

* cited by examiner

METHOD FOR PERFORMING OR SUPPORTING D2D COMMUNICATION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2012/010163, filed on Nov. 28, 2012, which claims the benefit of U.S. Provisional Application Ser. No. 61/564,302 filed on Nov. 29, 2011, the contents of which are all hereby incorporated by reference herein in their entirety.

TECHNICAL FIELD

The present invention relates to a wireless communication, and more particularly, to a method of performing/supporting a D2D (device to device) communication in a wireless communication system and apparatus therefor.

BACKGROUND ART

Recently, as smartphones and tablet PCs are widely used and multimedia communications of high capacity are activated, mobile traffic increases rapidly. The increasing tendency of the mobile traffic in the future is expected to increase about twice each year. Since most of the mobile traffic is transmitted through a base station, communication service providers are currently confronted with serious network overloads. In order to handle the increasing traffic, the communication service providers increase network equipment investment and commercialize the next generation mobile communication standards (e.g., WiMAX, LTE (long term evolution), etc.) for efficiently handling lots of traffic in a hurry. Yet, in order to bear the amount of traffic expected to increase further rapidly, it is time to seek for other solutions.

D2D (device-to device) communication is a distributive communication technology for directly delivering traffic between adjacent nodes without using such an infrastructure as a base station. In D2D communication environment, each node such as a mobile terminal and the like searches for another user equipment physically adjacent to the corresponding node by itself, establishes a communication session, and then transmits traffic. Thus, since the D2D communication can solve the traffic overload problem in a manner of distributing the traffic focused on a base station, the D2D communication is spotlighted as an elementary technology of the post 4G next generation mobile communication. Such a standardization organization as 3GPP, IEEE and the like is promoting D2D communication standard enactment based on LTE-A or Wi-Fi. And, such a company as Qualcomm and the like is developing an independent D2D communication technology.

D2D communication is expected to create new communication services as well as to contribute to increase performance of a mobile communication system. And, the D2D communication can support adjacency based social network services or such a service as a network game and the like. If a D2D link is utilized as a relay, it is able to solve the problem of connectivity of a user equipment in a radio shadow area. Thus, the D2D technology is expected to provide new services in various fields.

Actually, D2D communication technologies including IR (infrared ray) communication, Zigbee, RFID (radio frequency identification), NFC (near field communications) based thereon are widely used nowadays. Yet, since these technologies can support communications for special purposes within a very limited distance only, it may be difficult to exactly categorize these technologies into the D2D communication technologies for distributing traffic of a base station.

So far, the D2D communication is described. However, no efforts has been made to research and develop a resource allocation process for performing inter-cell D2D communication, an inter-cell D2D communication performing process and the like until now.

DISCLOSURE OF THE INVENTION

Technical Tasks

One object of the present invention is to provide a method for a D2D (device to device) user equipment to perform a D2D communication in a wireless communication system.

Another object of the present invention is to provide a method for a base station to support a D2D (device to device) communication in a wireless communication system.

Another object of the present invention is to a D2D user equipment performing a D2D communication in a wireless communication system.

Further object of the present invention is to provide a base station supporting a D2D (device to device) communication in a wireless communication system.

Technical tasks obtainable from the present invention may be non-limited by the above mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of performing a D2D (device-to-device) communication by a D2D user equipment in a wireless communication system, may include receiving polling interval information assigned for a transmission of a polling signal for the D2D communication from a base station and transmitting the polling signal to the base station in the assigned polling interval, wherein the polling signal includes an identifier of the D2D user equipment, an identifier of a target D2D user equipment selected through a discovery, and an indicator indicating that the D2D user equipment desires to perform the D2D communication. And, the polling signal may include QoS, SINR, threshold, user equipment status and the like required for the D2D communication. The polling interval may be located after a discovery interval in a frame structure. The identifier of the D2D user equipment is maintained although the D2D user equipment enters a deregistration state from a registered state by accessing the base station. A region for transmitting the polling signal is uniquely assigned per D2D user equipment in the polling interval.

The method may further include receiving information for the D2D communication from the base station through a D2D user equipment-specific control channel if the D2D user equipment is operating in active state. On the other hand, the method may further include receiving information for the D2D communication from the base station through a paging channel or a beacon signal for the D2D communication if the D2D user equipment is operating in idle state.

To further achieve these and other advantages and in accordance with the purpose of the present invention, as embodied and broadly described, a method of supporting a D2D (device-to-device) communication by a base station in a wireless communication system, may include transmitting polling interval information assigned for a transmission of a polling signal for the D2D communication to a D2D user equipment and receiving the polling signal from the D2D user equipment in the assigned polling interval, wherein the received polling signal includes an identifier of the D2D user equipment, an identifier of a target D2D user equipment selected through a discovery, and an indicator indicating that the D2D user equipment desires to perform the D2D communication. And, the polling signal may include QoS, SINR, threshold, user equipment status and the like required for the D2D communication.

The method may further include transmitting information for the D2D communication to the D2D user equipment through a D2D user equipment-specific control channel if the D2D user equipment is operating in active state. On the other hand, the method may further include transmitting information for the D2D communication to the D2D user equipment through a paging channel or a beacon signal for the D2D communication if the D2D user equipment is operating in idle state.

To further achieve these and other advantages and in accordance with the purpose of the present invention, as embodied and broadly described, in a D2D user equipment of performing a D2D (device-to-device) communication in a wireless communication system, the D2D user equipment may include a receiver configured to receive polling interval information assigned for a transmission of a polling signal for the D2D communication from a base station, a processor configured to control the polling signal to be transmitted to the base station in the assigned polling interval, and a transmitter configured to transmit the polling signal to the base station in the assigned polling interval, wherein the polling signal includes an identifier of the D2D user equipment, an identifier of a target D2D user equipment selected through a discovery, and an indicator indicating that the D2D user equipment desires to perform the D2D communication. And, the polling signal may include QoS, SINR, threshold, user equipment status and the like required for the D2D communication.

To further achieve these and other advantages and in accordance with the purpose of the present invention, as embodied and broadly described, in a base station of supporting a D2D (device-to-device) communication in a wireless communication system, the base station may include a transmitter configured to transmit polling interval information assigned for a transmission of a polling signal for the D2D communication to a D2D user equipment, a processor configured to control the polling signal to be received from the D2D user equipment in the assigned polling interval, and a receiver configured to receive the polling signal from the D2D user equipment in the assigned polling interval, wherein the received polling signal includes an identifier of the D2D user equipment, an identifier of a target D2D user equipment selected through a discovery, and an indicator indicating that the D2D user equipment desires to perform the D2D communication.

Advantageous Effects

According to an embodiment of the present invention, since it is not mandatory for a D2D user equipment in a cell to access a base station in order to perform a D2D communication, it is able to reduce a power consumed in the course of performing an access. Moreover, as a periodic polling and a polling response are used, a D2D user equipment can performs less blind detection or decoding on a downlink control channel in order to receive D2D information from a base station. Hence, D2D performance can be further enhanced.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR INVENTION

Figure 1:
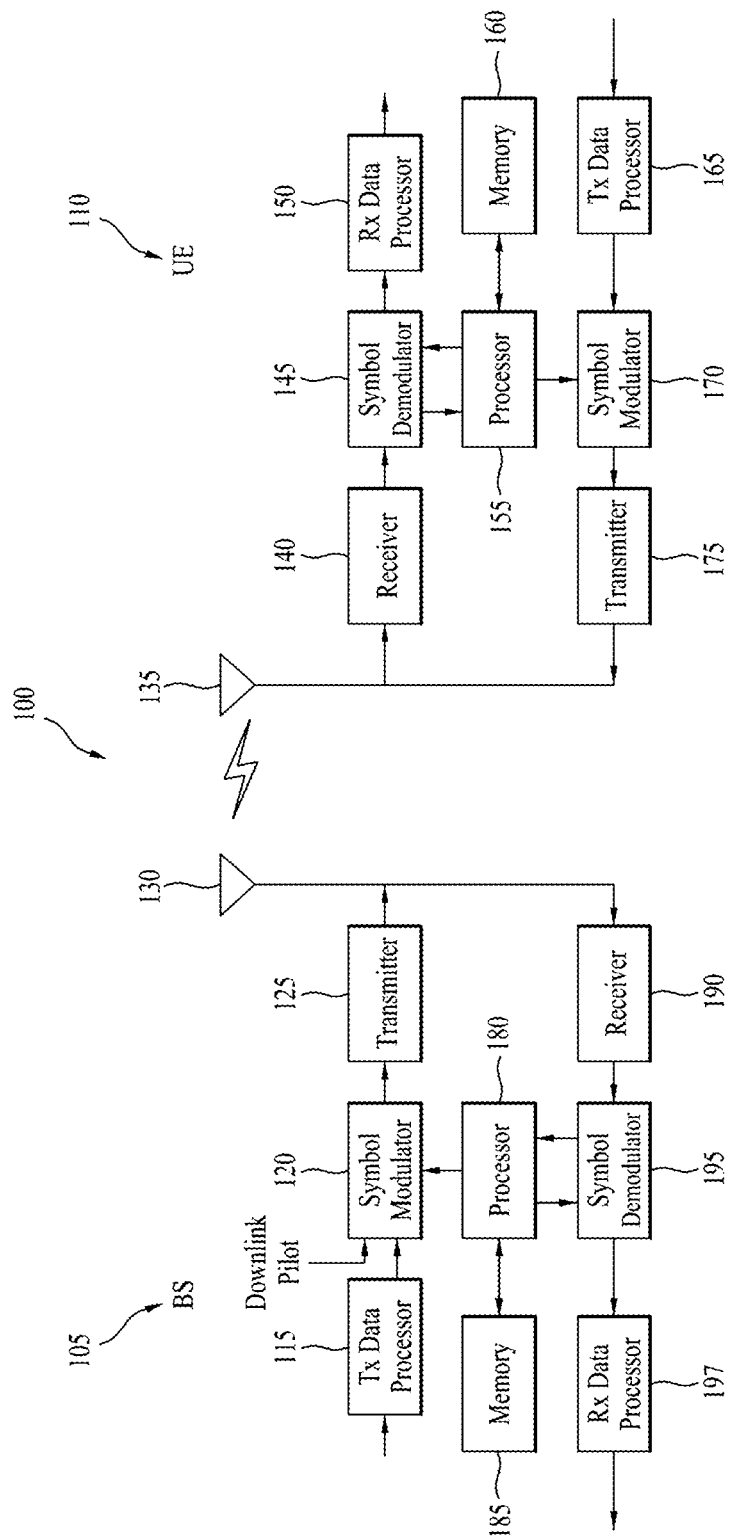
FIG. 1 is a block diagram for configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE system or 3GPP LTE-A system, contents of the present invention may be applicable to various kinds of other communication systems.

In a mobile communication system, a user equipment is able to receive information in downlink and is able to transmit information in uplink as well. Informations transmitted or received by the user equipment node may include various kinds of data and control informations. In accordance with types and usages of the informations transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

Although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with one of ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into $1^{st}$ layer L1, $2^{nd}$ layer L2 and $3^{rd}$ layer L3 based on 3 lower layers of OSI (open system interconnection) model well known to communication systems. A physical layer belongs to the $1^{st}$ layer and provides an information transfer service via a physical channel. RRC (radio resource control) layer belongs to the $3^{rd}$ layer and provides control radio resourced between UE and network. A user equipment and a base station may be able to exchange RRC messages with each other through a wireless communication network and RRC layers.

Generally, in order to perform a communication, a cellular user equipment located in a cell of a cellular network or communication accesses a base station, receives control information for exchanging data with the base station, and is then able to exchange the data with the base station. In particular, since a cellular user equipment transceives data through a base station, in order for one cellular user equipment to transmit data to another cellular user equipment, the former cellular user equipment transmits its data to the base station and the base station having received the data then transmits the received data to the latter cellular user equipment. Thus, in order for one cellular user equipment to transmit data to another cellular user equipment, since the former cellular user equipment can transmit the data through the base station only, the base station performs scheduling on a channel and resource for the data transceiving and should transmit the scheduled information to each of the cellular user equipments. Thus, in order to perform a communication between cellular user equipments through a base station, channel and resource allocation for transceiving data with a base station is required. Yet, a device-to-device (hereinafter abbreviated D2D) communication is configured to directly transceive a signal with a user equipment, to which data will be transmitted, without using a base station or a relay node. Hence, it is necessary to design a channel and resource structure to enable a signal to be transceived without being controlled by a base station. In designing such a channel and resource structure, when a D2D user equipment is working on a cellular network, the D2D user equipment needs to be designed to avoid collisions of channels and allocated resources for a legacy cellular user equipment.

Discovery of D2D User Equipment

In the present specification, a D2D user equipment may mean a user equipment supportive of a device-to-device direct communication (D2D communication) function, a user equipment performing a D2D communication, a user equipment capable of performing a D2D communication, or a user equipment performing D2D only.

In order to transmit data to a different D2D user equipment through a D2D communication, a user equipment performing a D2D communication needs to beforehand check presences of D2D user equipments located in a data transmittable/receivable surrounding. To this end, the corresponding D2D user equipment performs a D2D peer discovery. The D2D user equipment performs the D2D peer discovery within a discovery interval and all D2D user equipments share the discovery interval.

In the discovery interval, the D2D user equipment receives discovery signals transmitted by other D2D user equipments by monitoring a logical channel of a discovery region. Having received signals transmitted from other D2D user equipments, the corresponding D2D user equipment is able to compose an adjacent D2D user equipment list using the received signals. The D2D user equipment selects a channel or resource unused by other D2D user equipments as a discovery channel/discovery resource from the discovery interval and is then able to broadcast a discovery signal (e.g., information (identifier) of the corresponding D2D user equipment, etc.). By receiving this discovery signal, other D2D user equipments can be aware that the corresponding user equipment exists in a range for performing the D2D communication.

In case that a D2D communication for directly exchanging data between user equipments in a cell is performed in a manner of sharing a resource with an existing cellular network, each D2D user equipment is able to recognize D2D user equipments neighboring to the corresponding D2D user equipment. In doing so, a user equipment (hereinafter named a source D2D user equipment) desiring to perform a D2D communication discovers a user equipment (hereinafter named a target D2D user equipment or a destination D2D user equipment), with which the source D2D user equipment desires to perform the D2D communication, using a discovery list and is then able to check whether the D2D communication with the target D2D user equipment is performed through a communication with a base station. In doing so, for the D2D communication, since the D2D user equipment should access the base station and decode a control signal transmitted by the base station in order to receive a signal transmitted by the base station, the D2D user equipment consumes a considerable amount of power for the communication with the base station. Hence, a signaling and process for reducing the power consumption of the D2D user equipment are required.

The present invention proposes a new signaling and process for reducing a power consumption of a D2D user equipment. Although this proposed method takes 3GPP LTE/LTE-A as an example for the detailed description, the proposed invention may be usable by applying to other communication systems (e.g., IEEE 802.16, WiMAX, etc.) as well.

As mentioned in the foregoing description, a D2D user equipment existing in a cell performs a discovery to recognize adjacent D2D user equipments neighboring to the corresponding D2D user equipment in order to perform a D2D communication. In this case, the discovery can be performed by a centralized scheduling scheme or a distributed scheduling scheme. And, the present invention assumes that the discovery is performed by the distributed scheduling using information determined between D2D user equipments. Moreover, the present invention assumes that a base station controls whether to perform a D2D communication on an adjacent D2D user equipment recognized through a discovery by D2D user equipments [i.e., the control is performed by the centralized scheduling].

A D2D user equipment existing in a cell according to the present invention includes a user equipment capable of operating without accessing a base station. For instance, even if a status of a D2D user equipment for a base station is an idle state or an idle mode, the D2D user equipment can transceive signals with other D2D user equipments through D2D communications. As mentioned in the foregoing description, D2D user equipments can recognize neighbor D2D user equipments through discovery by a distributed (decentralized) scheduling scheme. In this case, the recognized D2D user equipments may include D2D user equipments failing to access D2D user equipments having accessed a base station.

In particular, in viewpoint of the base station, the discovered D2D user equipments are the user equipments in active or idle state. Hence, the D2D user equipment in idle state should transceive a signal for D2D by accessing the base station through an access procedure (e.g., initial ranging, registration, etc.) in order to perform a D2D communication. Yet, since a data transmission between D2D user equipments is performed not through the base station but through a direct transmission between D2D user equipments, the D2D user equipment is able to perform the D2D communication more effectively by reducing a power consumption used for the D2D user equipment to access the base station.

In order to prevent D2D user equipments from accessing a base station unnecessarily in order to perform a D2D communication, D2D user equipments in a cell perform a polling process irrespective of a status of a user equipment. The polling transmitted to a base station by a D2D user equipment can be performed through a following frame structure.

Figure 2A:
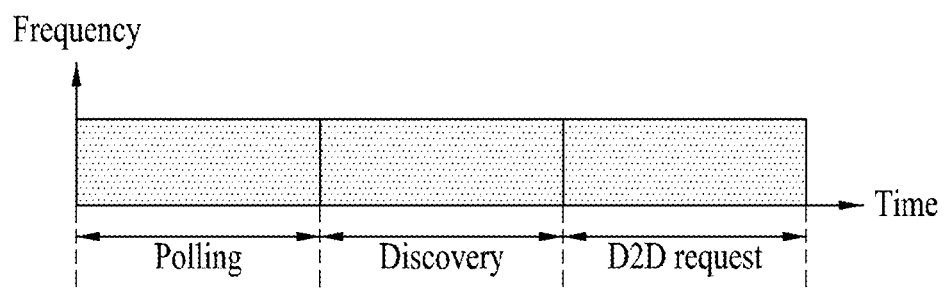
FIG. 2A and FIG. 2B show examples of a frame structure enabling a D2D user equipment to perform an efficient D2D communication according to the present invention.
Figure 2B:
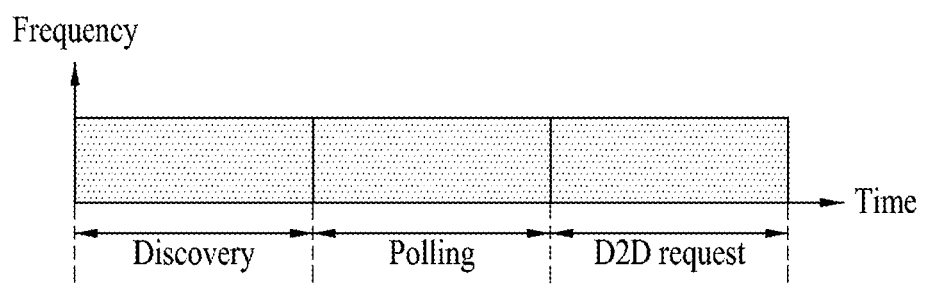

FIG. 2A and FIG. 2B show examples of a frame structure enabling a D2D user equipment to perform an efficient D2D communication according to the present invention.

In FIG. 2A and FIG. 2B, a horizontal axis indicates a time domain and a vertical axis indicates a frequency domain. Referring to FIG. 2A, a D2D user equipment in a cell sends a polling to a base station before performing a discovery (i.e., in a discovery interval). Referring to FIG. 2B, a D2D user equipment in a cell sends a polling to a base station after performing a discovery. Information on a frame structure for a polling is transmitted by a base station to D2D user equipments in a cell on a broadcast channel or a beacon (or paging) channel. And, the information on the frame structure for the polling may include information on a polling frame.

For instance, when a D2D user equipment switches to a D2D enabled state from a D2D disabled state, it is able to read information on a polling frame structure transmitted by a base station. In doing so, switching to the D2D enabled state from the D2D disabled state may include an action for the D2D user equipment in the D2D enabled state to turn on its own power or to move into another cell.

The polling information transmitted by the base station may include information on a period for D2D user equipments to perform a polling, polling configuration information (e.g., polling start point), information on a polling interval length (e.g., symbol unit, subframe unit, subcarrier unit, etc.), and the like. For instance, the polling period may have a value equal to or smaller than a discovery period. In particular, a D2D user equipment is able to perform a polling n times in a search period.

A D2D user equipment is able to transmit a polling to a base station through a region (e.g., subframe, slot, etc.) configured for the polling of D2D user equipments. In this case, the polling may be transmitted in a manner of containing information on the D2D user equipment. In doing so, the user equipment information contained in the polling transmitted to the base station by the D2D user equipment may vary depending on a position of a resource for the polling, i.e., a position of a resource allocated as a polling interval in a frame structure.

Having transmitted the polling, the D2D user equipment can transmit a signal for requesting a D2D communication to another D2D user equipment through a D2D request zone.

Case of Assigning a Polling Interval Before a Discovery Interval

First of all, a case of assigning a polling interval before a discovery interval is described as follows. In this case, a polling transmitted by a D2D user equipment may contain identification information of each user equipment and information indicating whether to perform a D2D communication. The polling transmitted by the D2D user equipment may contain information on a type of a D2D communication supportable by each user equipment or information on a type of a D2D communication desired by each user equipment. And, the polling transmitted by the D2D user equipment may further contain location information of the D2D user equipment. A signal transmitted through the polling by the D2D user equipment can be configured with a combination of a D2D user equipment ID and a D2D indicator or a combination of a D2D indicator and a D2D user equipment ID. In this case, the D2D indicator indicates whether the D2D communication is possible or whether the D2D communication is desired and can be represented with 1 bit. In this case, the 1 bit can be placed as MST (most significant bit) or LSB (least significant bit) of the polling signal transmitted by the D2D user equipment.

Case of Assigning a Polling Interval after a Discovery Interval

First of all, a polling interval, as shown in FIG. 2B, can be assigned to a corresponding position after a discovery interval. Hence, in case that a D2D user equipment performs a polling after a discovery, the polling may contain a source D2D user equipment information, a target D2D user equipment information (e.g., an information on a D2D user equipment selected through a discovery), an information of a D2D indicator (D2D_ind), an information of a D2D request indicator (D2D_reqeust_ind), and the like. In this case, the user equipment information may include an identifier (ID) of the D2D user equipment or a different type device identifier. The D2D indicator can indicate whether a D2D communication is possible or impossible or whether a D2D communication is desired or not. And, the D2D request indicator can indicate a request for performing a D2D communication. Moreover, in this case, the user equipment information transmitted by the D2D user equipment may include a D2D TID (terminal identifier) assigned by a base station to a general user equipment in a cellular network by performing an initial entry on a network. In case of a D2D user equipment, a base station assigns an ID for an operation in a cellular network and an ID for a D2D communication to the D2D user equipment. In this case, the ID assigned for the D2D communication is maintained in a corresponding cell irrespective of a state (e.g., an active state, an idle state, etc.) of the user equipment. Hence, even if the user equipment enters the idle state through deregistration, the ID assigned for the D2D communication continues to be used without being returned unlike STID (station identifier).

A polling signal transmitted to a base station by each D2D user equipment can be configured in a manner of being masked with a D2D ID of a user equipment. In order to check an error of the masked signal, the corresponding signal can be transmitted in a manner of having a tail bit attached thereto. Moreover, the base station is able to determine a transmission region of a polling signal to be transmitted by each D2D user equipment in a polling region (or poling interval) in a cell through information of a D2D user equipment and is also able to inform the D2D user equipment of such polling information.

According to the present invention, every D2D user equipment in a cell transmits a polling to a base station or a D2D user equipment currently capable of performing a D2D communication or only a D2D user equipment desiring a D2D user equipment is able to transmit a polling. Thus, through polling signals transmitted by D2D user equipments, a base station is able to recognize D2D user equipments in a cell and is also able to recognize user equipments capable of performing D2D communications among the D2D user equipments. Having received the polling signals transmitted by the D2D user equipments in the cell, the base station stores information of the D2D user equipments capable of performing the D2D communication by listing up the polling information. In this case, the information of the D2D user equipments may be saved in form of a table or a bitmap.

Having received the polling from D2D user equipments, a base station is able to transmit an acknowledgement message (e.g., polling_Ack) for the polling reception and a paging period (e.g., a paging period for D2D user equipment, a cellular paging period, etc.) to the D2D user equipments through a broadcast channel. In doing so, when the base station transmits the polling information to the D2D user equipments in a cell, the broadcast channel for transmitting the polling_Ack and the paging period information and the transmitted period information can be contained in the polling information. If so, the corresponding D2D user equipment receives the paging information transmitted by the base station in a given period and is then able to receive information on D2D using the received paging information.

A base station transmits a D2D information to a D2D user equipment through a cellular paging. Alternatively, a base station configures a paging for a D2D user equipment and is then able to transmit the configured paging to the corresponding D2D user equipment. In case that the base station transmits the D2D information through the cellular paging, the base station can control the corresponding D2D user equipment to receive the information only in a manner of configuring a D2D indicator in a paging message or an indicator indicating whether D2D is supported or through a D2D ID. In particular, the base station is able to transmit an existing paging message by adding information on D2D to the existing paging message.

Having obtained an information on a user equipment capable of performing D2D in a cell from a polling, a base station is able to determine whether to perform a D2D communication by matching an information of a target D2D user equipment in a D2D request transmitted by a source D2D user equipment to a polling information list in order to perform the D2D. In particular, the base station is able to determine whether to transmit the D2D request to the target D2D user equipment or whether to decline the D2D request.

In doing so, if the target D2D user equipment information transmitted by the source D2D user equipment is not saved in the poling information list or the corresponding D2D user equipment does not perform the D2D communication, the base station notifies to the source D2D user equipment that the D2D communication with the corresponding D2D user equipment (i.e., target D2D user equipment) is not available. Such a D2D operation can be performed by a different method depending on statuses of the source and target D2D user equipments performing the D2D communication in the cellular network. And, a corresponding D2D performing procedure can be defined in accordance with the statuses of the source and target D2D user equipments as follows. This is described in detail with reference to the accompanying drawings as follows.

Figure 3A:
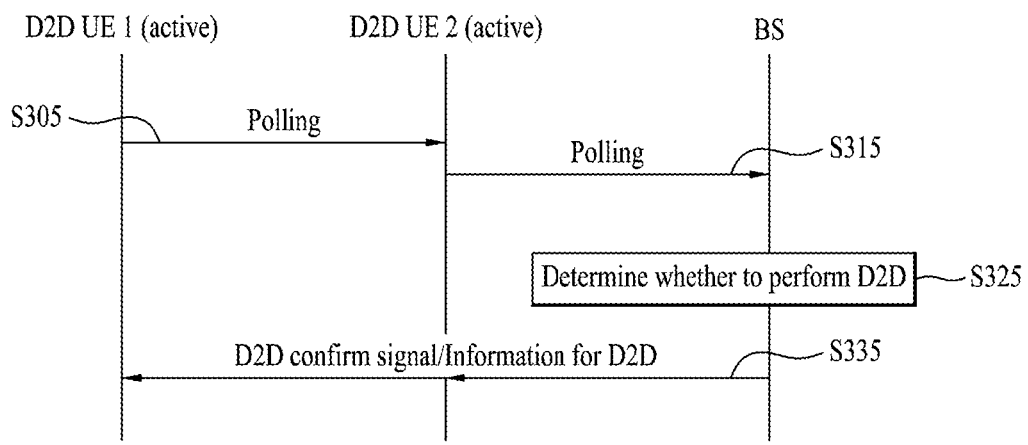
FIG. 3A and FIG. 3B show processes for performing a D2D communication in an active state of a source D2D user equipment.
Figure 3B:
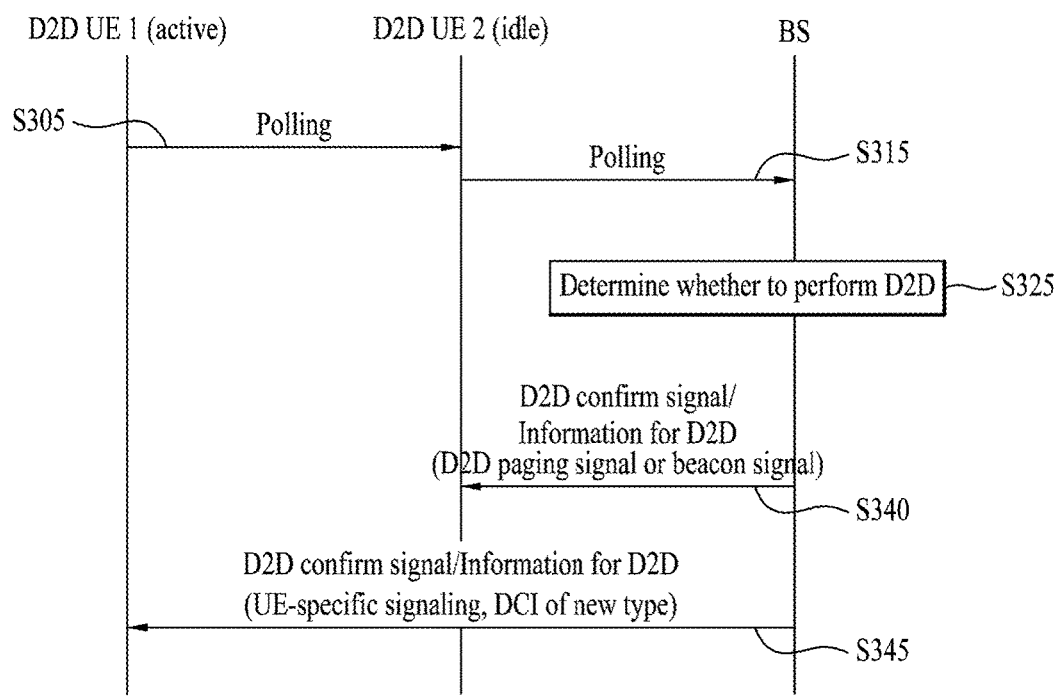

FIG. 3A and FIG. 3B show processes for performing a D2D communication in an active state of a source D2D user equipment.

FIG. 3A shows a D2D communication performing process if a D2D user equipment 1 (i.e., a source D2D user equipment) is in active state and a D2D user equipment 2 (i.e., a target D2D user equipment) is in activate state of accessing a base station.

The D2D user equipment 1 (i.e., the source D2D user equipment) is able to transmit a polling to the base station in a polling interval [S305]. And, the D2D user equipment 2 (i.e., the target D2D user equipment) selected by the D2D user equipment 1 (i.e., the source D2D user equipment) through a discovery is able to transmit a polling to the base station as well [S315]. In the step S315, the polling of the D2D user equipment 2 (i.e., the target D2D user equipment) may be performed in accordance with a polling procedure (before/after the discovery) or may not. In doing so, as mentioned in the foregoing description, a transmitted polling signal can be transmitted in a manner of carrying contents contained in polling information thereon. In particular, the polling signal can further contain a QoS (quality of service), an SINR (signal to interference plus noise ratio), a threshold, a user equipment status and the like, which are additionally required for a D2D communication.

Since both of the D2D user equipment 1 (i.e., the source D2D user equipment) and the D2D user equipment 2 (i.e., the target D2D user equipment) are in active state, the base station determines whether to perform the D2D communication by obtaining a D2D polling signal (a D2D request information included) transmitted by the D2D user equipment 1 (i.e., the source D2D user equipment) and a presence or non-presence of the target D2D user equipment [S325]. In case that several D2D user equipments make requests for the D2D for single D2D user equipment, the base station can determine a D2D user equipment, with which the D2D communication will be performed, in consideration of the QoS (quality of service) transmitted through the polling, a data type and the like. For instance, if the D2D user equipment 2 (i.e., the target D2D user equipment) transmits a D2D polling to the base station as well or transmits the polling by setting 'D2D_ind=1', the base station can transmit an information for the D2D communication and a D2D confirm signal to each of the D2D user equipment 1 (i.e., the source D2D user equipment) and the D2D user equipment 2 (i.e., the target D2D user equipment) [S335]. In doing so, since each of the D2D user equipment 1 (i.e., the source D2D user equipment) and the D2D user equipment 2 (i.e., the target D2D user equipment) has accessed the base station, the base station can transmit the information for the D2D communication and the D2D confirm signal to each of the D2D user equipment 1 (i.e., the source D2D user equipment) and the D2D user equipment 2 (i.e., the target D2D user equipment) using a UE-specific channel (i.e., a control channel such as PDCCH and the like) or a new DCI (downlink control information) for the D2D.

FIG. 3B shows a D2D communication performing process if a D2D user equipment 1 (i.e., a source D2D user equipment) is in active state and a D2D user equipment 2 (i.e., a target D2D user equipment) is in idle state.

First of all, the steps S305 to S325 shown in FIG. 3A can equally apply to the case shown in FIG. 3B. Thereafter, the base station is able to transmit an information required for the D2D communication to the D2D user equipment 2 (i.e., the target D2D user equipment) in the idle state through a D2D paging signal transmitted in a predetermined period (or interval) [S340]. Since the D2D user equipment 2 (i.e., the target D2D user equipment) receives the information on the D2D without accessing the base station, it needs not to access the base station. Therefore, it is able to reduce an unnecessary access of a D2D user equipment to a base station. Meanwhile, since the D2D user equipment 1 (i.e., the source D2D user equipment) currently accesses the base station, the base station can transmit the D2D information to the D2D user equipment 1 (i.e., the source D2D user equipment) through UE-specific signaling (i.e., control information such as PDCCH, ePDCCH and the like) [S345]. Alternatively, the base station can transmit the D2D information to the D2D user equipment 1 (i.e., the source D2D user equipment) using a DCI format of a new type for D2D.

In the step S340 and the step S345, the information for the D2D, which is transmitted by the base station to each of the D2D user equipment 1 (i.e., the source D2D user equipment) and the D2D user equipment 2 (i.e., the target D2D user equipment), may include a start point of the D2D communication, a time offset, a reference signal index, a pilot pattern, a cyclic shift value, a resource allocation information, a power control information an FS and the like.

Figure 4A:
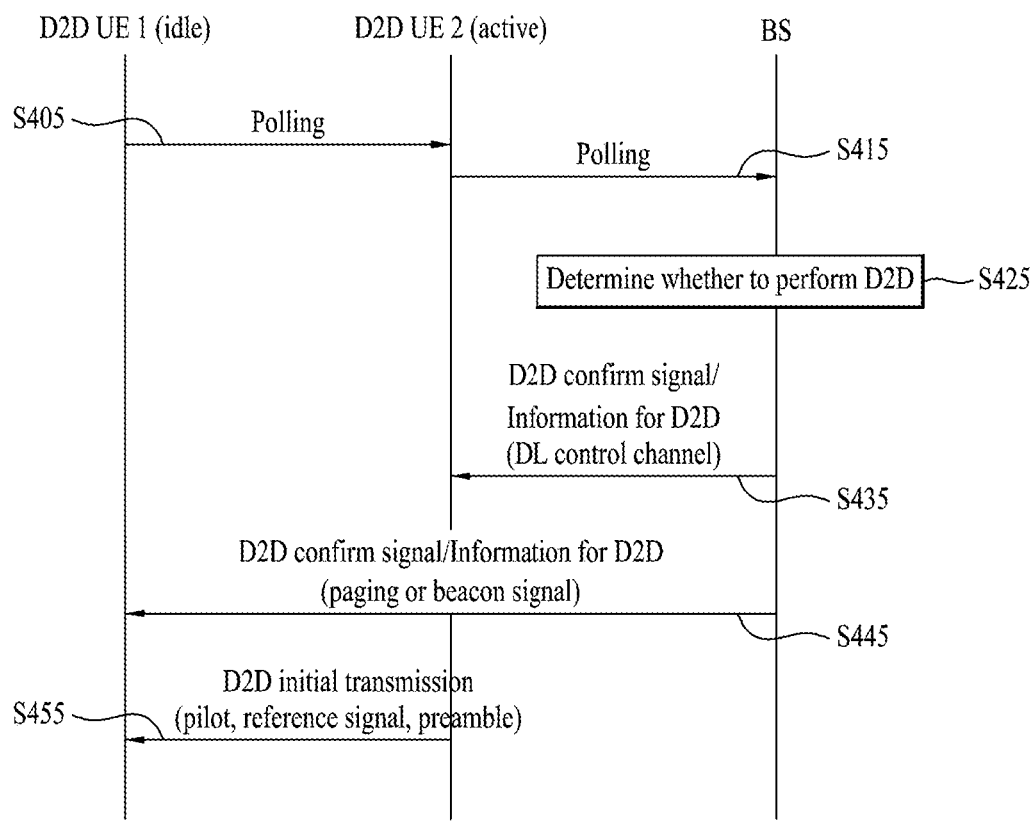
FIG. 4A and FIG. 4B show processes for performing a D2D communication in an idle state of a source D2D user equipment.
Figure 4B:
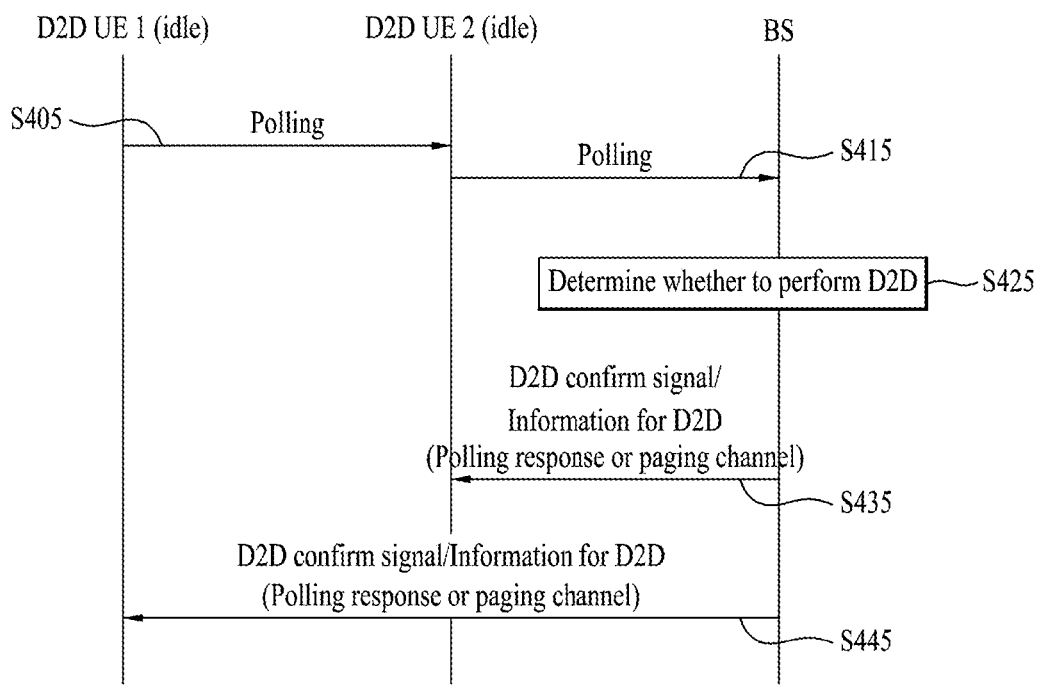

FIG. 4A and FIG. 4B show processes for performing a D2D communication in an idle state of a source D2D user equipment.

FIG. 4A shows a D2D communication performing process if a D2D user equipment 1 (i.e., a source D2D user equipment) is in active state and a D2D user equipment 2 (i.e., a target D2D user equipment) is in activate state of accessing a base station.

Likewise, the steps S305 to S325 shown in FIG. 3A can equally apply to steps S405 to S425 shown in FIG. 4A. Thereafter, the base station can transmit information on D2D to the D2D user equipment 2 (i.e., the target D2D user equipment) through a downlink control channel (e.g., PDCCH, PDCCH (D_PDCCH) for D2D user equipment, ePDCCH (evolved PDCCH), etc.) [S435].

Meanwhile, the D2D user equipment 1 (i.e., the source D2D user equipment) is able to receive a D2D confirm signal and/or the information for the D2D from the base station through a paging signal periodically transmitted for the D2D communication or a beacon signal for the D2D [S445].

Since the D2D user equipment 2 (i.e., the target D2D user equipment) currently accesses the base station, an initial transmission for the D2D can be transmitted by the D2D user equipment 2 (i.e., the target D2D user equipment) to the D2D user equipment 1 (i.e., the source D2D user equipment) [S455]. The D2D user equipment 2 (i.e., the target D2D user equipment) can control the D2D user equipment 1 (i.e., the source D2D user equipment) to perform a link measurement for performing the D2D communication by transmitting a pilot or reference signal having data excluded therefrom, a preamble and the like in the D2D initial transmission.

FIG. 4B shows a D2D communication performing process if a D2D user equipment 1 (i.e., a source D2D user equipment) is in idle state and a D2D user equipment 2 (i.e., a target D2D user equipment) is in idle state of not accessing a base station.

Likewise, the steps S405 to S425 shown in FIG. 4A can equally apply to steps S405 to S425 shown in FIG. 4B. Thereafter, since both of the D2D user equipment 1 (i.e., the source D2D user equipment) and the D2D user equipment 2 (i.e., the target D2D user equipment) performing the D2D communication do not access the base station currently, the base station can transmit D2D information to the two user equipments through a polling response or a paging channel [S435, S445].

Moreover, the descriptions with reference to FIG. 3A and FIG. 3B and the descriptions with reference to FIG. 4A and FIG. 4B can apply to FIG. 2A and FIG. 2B indicating the polling interval positions.

As mentioned in the foregoing description, a base station can obtain whether a D2D will be performed through a polling and a D2D user equipment can receive information necessary for performing the D2D communication from the base station through a paging channel. Hence, since it is not mandatory for a D2D user equipment in a cell to access a base station in order to perform a D2d communication, a power consumed for a process for performing an access can be reduced. As a step of blind-detecting or decoding a downlink control channel in order for a D2D user equipment to receive D2D information from a base station can be reduced by using a periodic polling and a polling response, D2D performance can be further enhanced.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, a method of performing/supporting a D2D communication in a wireless communication system and apparatus therefor are industrially applicable to various kinds of communication systems including 3GPP LTE, 3GPP LTE-A, IEEE 802 and the like.

What is claimed is:

1. A method of performing a device-to-device (D2D) communication by a D2D user equipment in a wireless communication system, the method comprising:
receiving polling interval information assigned for a transmission of a polling signal for the D2D communication from a base station;
transmitting, in an idle state, the polling signal to the base station in the assigned polling interval; and
in response to the polling signal for the D2D communication, receiving, from the base station, D2D communication information including a start point of the D2D communication with a target D2D user equipment through a paging channel when the D2D user equipment is operating in the idle state,
wherein the polling signal includes an identifier of the D2D user equipment, an identifier of the target D2D user equipment selected through a discovery, and an indicator indicating that the D2D user equipment desires to perform the D2D communication.

2. The method of claim 1, wherein the polling interval is located after a discovery interval in a frame structure.

3. The method of claim 1, wherein the identifier of the D2D user equipment is maintained although the D2D user equipment enters a deregistration state from a registered state by accessing the base station.

4. The method of claim 1, wherein a region for transmitting the polling signal is uniquely assigned per D2D user equipment in the polling interval.

5. The method of claim 1, further comprising:
if the D2D user equipment is operating in active state, receiving, from the base station, the D2D communication information via a D2D user equipment-specific control channel.

6. The method of claim 1, wherein the D2D communication information further including at least one of resource allocation information, and power control information.

7. A method of supporting a device-to-device (D2D) communication by a base station in a wireless communication system, comprising the steps of:
transmitting polling interval information assigned for a transmission of a polling signal for the D2D communication to a D2D user equipment;
receiving the polling signal from the D2D user equipment operating in an idle state in the assigned polling interval; and
in response to the polling signal for the D2D communication, transmitting, to the D2D user equipment, D2D communication information including a start point of the D2D communication with a target D2D user equipment through a paging channel when the D2D user equipment is operating in the idle state,
wherein the received polling signal includes an identifier of the D2D user equipment, an identifier of the target D2D user equipment selected through a discovery, and an indicator indicating that the D2D user equipment desires to perform the D2D communication.

8. The method of claim 7, further comprising:
if the D2D user equipment is operating in active state, transmitting the D2D communication information to the D2D user equipment through a D2D user equipment-specific control channel.

9. The method of claim 7, wherein the D2D communication information further including at least one of resource allocation information, and power control information.

10. A device-to-device (D2D) user equipment of performing a D2D communication in a wireless communication system, the D2D user equipment comprising:
a receiver configured to receive polling interval information assigned for a transmission of a polling signal for the D2D communication from a base station;
a processor configured to:
control the polling signal to be transmitted, in an idle state, to the base station in the assigned polling interval, and
control the receiver to receive, from the base station in response to the polling signal for the D2D communication, D2D communication information including a start point of the D2D communication with a target D2D user equipment through a paging channel when the D2D user equipment is operating in the idle state; and
a transmitter configured to transmit the polling signal to the base station in the assigned polling interval,
wherein the polling signal includes an identifier of the D2D user equipment, an identifier of the target D2D user equipment selected through a discovery, and an indicator indicating that the D2D user equipment desires to perform the D2D communication.

11. A base station of supporting a device-to-device (D2D) communication in a wireless communication system, the base station comprising:
a transmitter configured to transmit polling interval information assigned for a transmission of a polling signal for the D2D communication to a D2D user equipment;
a processor configured to:
control the polling signal to be received from the D2D user equipment operating in an idle state in the assigned polling interval, and
in response to the polling signal for the D2D communication, control the transmitter to transmit, to the D2D user equipment, D2D communication information including a start point of the D2D communication with a target D2D user equipment through a paging channel when the D2D user equipment is operating in the idle state; and
a receiver configured to receive the polling signal from the D2D user equipment in the assigned polling interval,
wherein the received polling signal includes an identifier of the D2D user equipment, an identifier of the target D2D user equipment selected through a discovery, and an indicator indicating that the D2D user equipment desires to perform the D2D communication.

* * * * *